United States Patent [19]
Mitarai et al.

[11] Patent Number: 5,784,117
[45] Date of Patent: Jul. 21, 1998

[54] AUTOMATIC MODE DETECTOR FOR TV BROADCASTING SYSTEM

[75] Inventors: Shozu Mitarai; Akira Arimizu, both of Kagoshima, Japan

[73] Assignee: Sony Corporation, Japan

[21] Appl. No.: 701,392

[22] Filed: Aug. 22, 1996

[30] Foreign Application Priority Data

Aug. 25, 1995 [JP] Japan .................. 7-217930

[51] Int. Cl.[6] .................................................. H04N 5/46
[52] U.S. Cl. .................. 348/558; 348/555; 348/557
[58] Field of Search .............................. 348/555, 557, 348/558, 725, 638, 643; H04N 5/46

[56] References Cited

U.S. PATENT DOCUMENTS

| | | |
|---|---|---|
| 5,119,177 | 6/1992 | Lin .................................. 358/21 |
| 5,239,367 | 8/1993 | Sato ................................. 358/21 |
| 5,311,301 | 5/1994 | Jae-Gyun ......................... 348/453 |
| 5,579,056 | 11/1996 | Chang ............................. 348/555 |

*Primary Examiner*—Glenton B. Burgess
*Attorney, Agent, or Firm*—Ronald P. Kananen

[57] ABSTRACT

The automatic-discriminating apparatus is constituted by functional blocks such as a killer circuit, an APC circuit, a switch, and an automatic discrimination control circuit. The switch connects one of crystal oscillators to a VCO of the APC circuit by a control signal from the automatic discrimination control circuit. The automatic discrimination control circuit divides one vertical scanning period into predetermined sections. When receiving a killer signal indicating the OFF state from the killer circuit at the predetermined sections even one time, it outputs a control signal holding the connection state thereof to the switch, and holds the APC circuit in the locking state. When receiving a killer signal indicating the ON state at the divided predetermined sections a predetermined number of times, it outputs a control signal connecting the other crystal oscillator through the VCO to the switch. As a result, the time for discriminating the TV broadcast systems can be shortened, a malfunction can be avoided, and a stable discrimination can be achieved.

12 Claims, 7 Drawing Sheets

AUTOMATIC MODE DETECTOR FOR TV BROADCASTING SYSTEM

BACKGROUND INVENTION

1. Field of the Invention

The present invention relates to an automatic mode detection for a TV broadcasting system (a broadcast system automatic-discriminating apparatus) which is provided in a multiple-system television receiver, automatically discriminates the television signals (TV signals) of different broadcast systems, and performs reception.

2. Description of the Related Art

A multiple-system television receiver, so as to deal with the different TV broadcast systems, for example, the NTSC broadcast system used in Japan, the PAL broadcast system used in Germany, the South American area, etc., the SECAM broadcast system used in France, etc. must discriminate the broadcast system by a certain means and operate the video receiver differently in accordance with each broadcast system.

Particularly in an area where TV signals of a plurality of broadcast systems can be received, in order to enable the viewer to watch the TV program without having to be concerned with the broadcast system, it is necessary to provide an broadcast system automatic-discriminating apparatus in which the broadcast system can be automatically discriminated on the TV receiver side, automatically discriminate the TV signals of the respective broadcast systems, and perform signal processing with respect to the TV signals by the methods in accordance with them.

In general, this type of broadcast system automatic-discriminating apparatus performs the automatic discrimination of the broadcast system according to the difference of the frequencies of the color sub-carrier waves (SC) provided for transferring the information of color in the TV signals of the respective broadcast systems.

Figure 1:
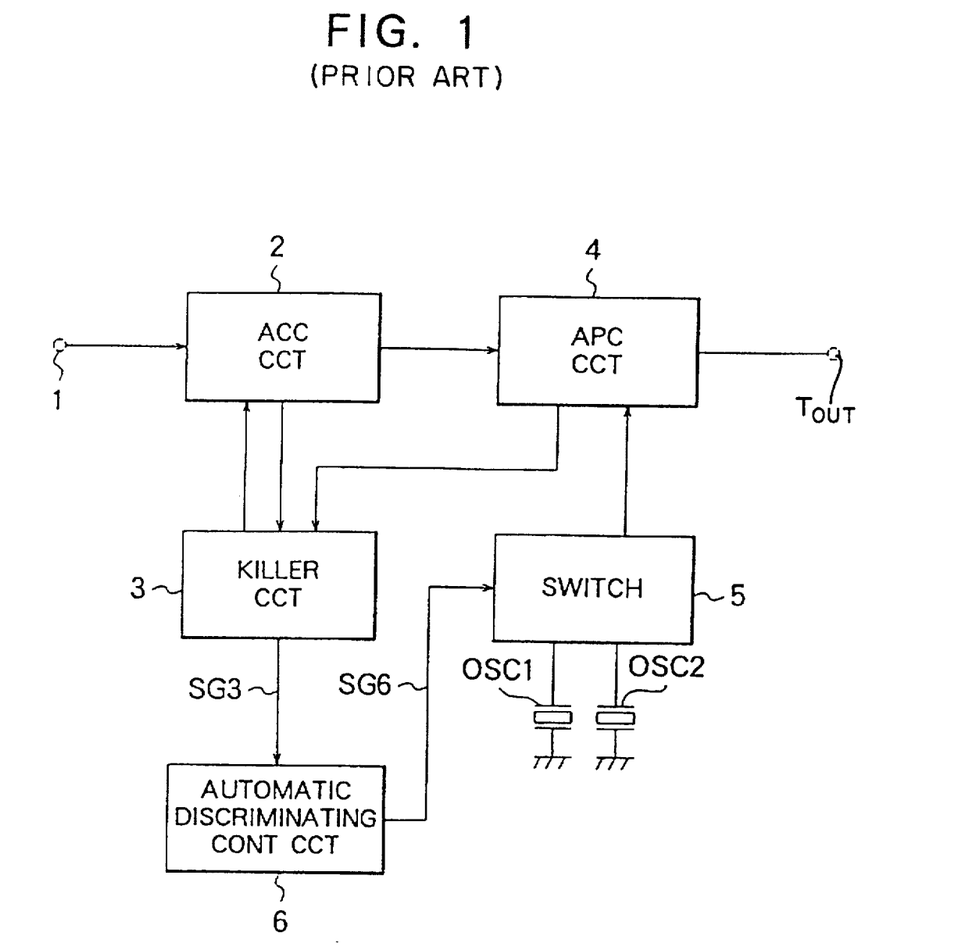
FIG. 1 is a simple block diagram of a broadcast system automatic-discriminating apparatus of a related art.
Figure 2:
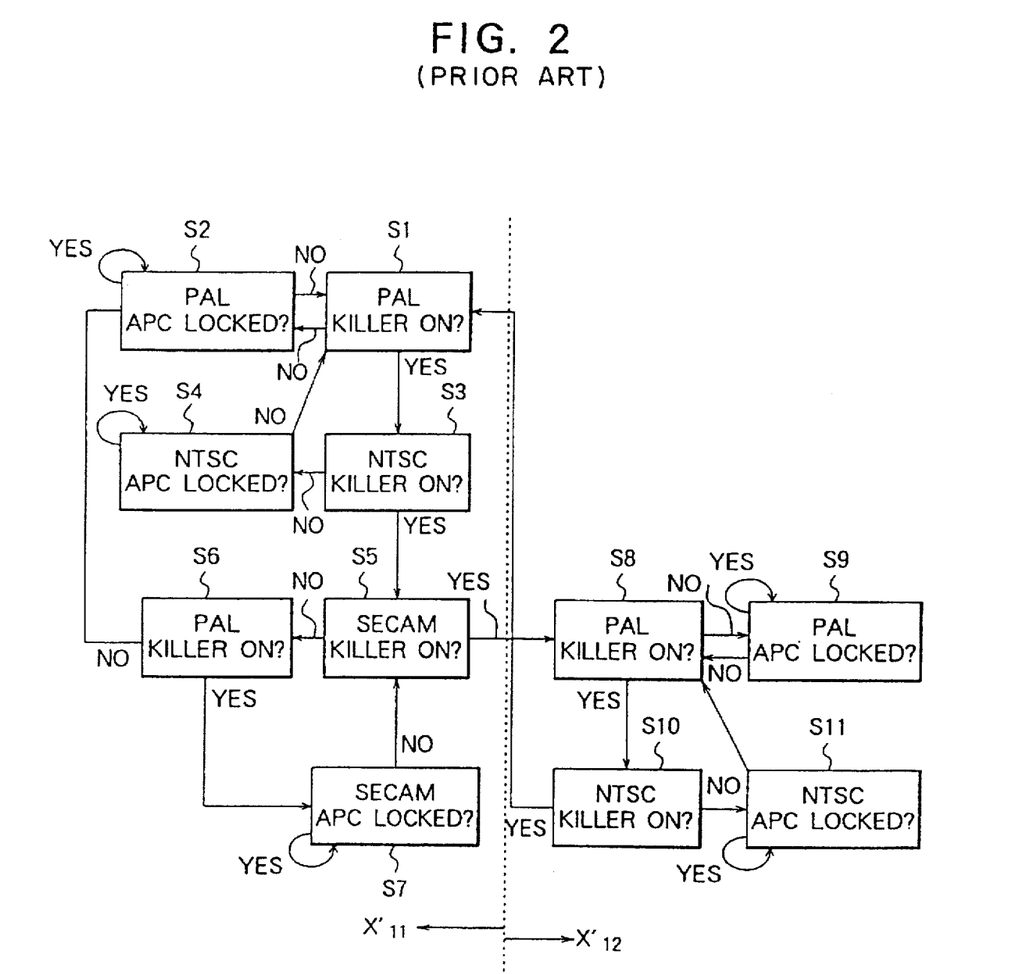
FIG. 2 is a flow chart of the operation of the broadcast system automatic-discriminating apparatus of the related art.

FIG. 1 is a simple block diagram showing one example of a broadcast system automatic-discriminating apparatus, having an automatic discrimination function; and FIG. 2 is a view showing a flow chart of the operation thereof.

As shown in FIG. 1, this broadcast system automatic-discriminating apparatus is constituted by an input terminal 1, an automatic color control (ACC) circuit 2, a killer circuit 3, an automatic phase control (APC) circuit 4, a switch 5, an automatic discrimination control circuit 6, and two crystal oscillators OSC1 and OSC2.

A color burst signal, obtained by a band amplifier and a color burst signal amplifier, is input to the input terminal 1.

The ACC circuit 2 detects the amplitude of the input color burst signal, generates a DC voltage based on this, and adjusts the gain of the amplifying circuit, thereby to control the system so as to hold the density of the color of the color video signal constant.

The killer circuit 3 receives the signal from the ACC circuit 2 and the signal from the APC circuit 4, detects the presence/absence of the color burst signal, outputs a killer signal SG3 indicating the OFF state when the color burst signal is detected, and outputs a killer signal SG3 indicating the ON state when the color burst signal is not detected.

Usually, it is decided by the output signal SG3 of the killer circuit 3 whether the received TV signal is a color signal or a monochrome (black and white) signal. Then, when it is a color signal, the band amplifying circuit for the color demodulation is operated. When it is a monochrome signal, the operation of the band amplifying circuit for the color demodulation is stopped, and the generation of color noise in the monochrome video signal is suppressed. Here, the output signal SG3 of this killer circuit 3 is used for the automatic discrimination of the broadcast system.

The APC circuit 4 generates an oscillation signal having the same frequency as that of the color burst signal with the color burst signal as a reference. This oscillation signal is output to an output terminal TOUT as the reference sub-carrier wave for the color demodulation and input to the color demodulation circuit.

The switch 5 receives the control signal SG6 from the automatic discrimination control circuit 6, selects either oscillator of the crystal oscillator OSC1 or the crystal oscillator OSC2, and inputs the oscillated signal of the selected oscillator to the APC circuit 4.

Below, the operation of a broadcast system automatic-discriminating apparatus as a related art will be described with reference to the block diagram of FIG. 1 and the flow chart of FIG. 2.

As shown in FIG. 2, the automatic discrimination operation includes steps S1 to S11. Among them, steps S1 to S7 are a discrimination operation for when the crystal oscillator OSC1 is selected, and steps S8 to S11 are a discrimination operation for when the crystal oscillator OSC2 is selected.

Here, using the control signal SG6 from the automatic discrimination control circuit 6, for example the crystal oscillator OSC1 is selected first, and automatic discrimination of the broadcast system is carried out.

As shown in FIG. 1, it is first assumed that the received TV signal is that of the PAL broadcast system, and the output of the killer circuit 3 is checked as shown at step S1. If the output signal SG3 of the killer circuit 3 is a signal indicating the ON state, it is decided that the received signal is not by the PAL broadcast system, and the operation is advanced to step S3 for discriminating the next broadcast system, for example, the NTSC broadcast system.

Here, when the output signal SG3 of the killer circuit 3 is a signal indicating the OFF state, the operation shown at step S2 is carried out. Namely, when the locking state of the APC circuit 4 is checked and the APC circuit 4 is locked, it is decided that the received signal is a signal of the PAL broadcast system, and the predetermined signal processing is carried out in accordance with the PAL broadcast system in the receiver. If the APC circuit 4 is not locked, the processing routine returns to step S1, where the signal of the PAL broadcast system is assumed again, and the output signal SG3 of the killer circuit 3 is checked.

At step S1, when the output signal SG3 of the killer circuit 3 is a signal indicating the ON state, it is decided that it is not the signal of the PAL broadcast system, and the processing routine goes to step S3, at which the output signal SG3 of the killer circuit 3 is checked by assuming that the received signal is the signal of the NTSC broadcast system. At this time, when the output signal SG3 of the killer circuit 3 is a signal indicating the OFF state, the processing routine goes to step S4, at which the locking state of the APC circuit 4 is checked. If the APC circuit 4 is locked, it is decided that the received signal is the signal of the NTSC broadcast system. At this time, the receiver performs the predetermined signal processing in accordance with the NTSC broadcast system. If the APC circuit 4 is not locked, the processing routine returns to step S1, where the signal of the PAL broadcast system is assumed again and the output signal SG3 of the killer circuit 3 is checked.

On the other hand, at step S3, when the output signal SG3 of the killer circuit 3 is a signal indicating the ON state, it is decided that the received signal is not the signal of the NTSC broadcast system and the processing routine goes to step S5, at which the signal of the SECAM broadcast system is assumed, and the output signal SG3 of the killer circuit 3 is checked.

If the output signal SG3 of the killer circuit 3 is a signal indicating the OFF state, the processing routine goes to step S6, at which the output signal SG3 of the killer circuit 3 is checked in the PAL broadcast system. When the output signal SG3 of the killer circuit 3 is a signal indicating the ON state here, the processing routine goes to step S7, at which the locking state of the APC circuit 4 is checked. When the APC circuit 4 is locked, it is decided that the received signal is the signal of the SECAM broadcast system, and the receiver performs the predetermined signal processing in accordance with the SECAM broadcast system. When the APC circuit 4 is not locked, the processing routine returns to step S5 again, and the output signal SG3 of the killer circuit 3 is checked while assuming the SECAM broadcast system.

On the other hand, at step S6, continuing from when the output signal SG3 of the killer circuit 3 in the SECAM broadcast system of step S5 indicates the OFF state, when the output signal SG3 of the killer circuit 3 indicates the OFF state also in the PAL broadcast system, the processing routine goes to step S2, at which the locking state of the APC circuit 4 is checked.

An explanation was made above of the automatic discrimination operation where the crystal oscillator OSC1 was selected. In the discrimination operation, when the output signal SG3 of the killer circuit 3 is a signal indicating the ON state in all of the PAL broadcast system, NTSC broadcast system, and SECAM broadcast system, the crystal oscillator connected to the APC circuit 4 is switched from the oscillator OSC1 to the oscillator OSC2 by the control signal SG6 from the automatic discrimination control circuit 6, and the operation of steps S8 to S11 shown in FIG. 9 is carried out.

As shown in FIG. 2, in a state where the crystal oscillator OSC2 is selected, step S8 is first carried out. Namely, the output signal SG3 of the killer circuit 3 is checked while assuming that the received signal is the signal of the PAL broadcast system. When the output signal SG3 of the killer circuit 3 is a signal indicating the OFF state, the processing routine goes to step S9, at which the locking state of the APC circuit 4 is checked. When the APC circuit 4 is locked, it is decided that the received signal is the signal of the PAL broadcast system, and the receiver performs the predetermined signal processing in accordance with the PAL broadcast system. If the APC circuit 4 is not locked, the processing routine returns to step S8 again, and the output signal SG3 of the killer circuit 3 is checked.

In the operation of step S8, when the output signal SG3 of the killer circuit 3 has become a signal indicating the ON state in the PAL broadcast system, it is decided that the received signal is not the signal of the PAL broadcast system and the processing routine goes to next step S10, that is, the output signal SG3 of the killer circuit 3 is checked while assuming that the received signal is the signal of the NTSC broadcast system. If the output signal SG3 of the killer circuit 3 has become a signal indicating the OFF state, the processing routine goes to step S11, at which the locking state of the APC circuit 4 is checked. When the APC circuit 4 has been locked, it is decided that the received signal is a signal of the NTSC broadcast system, and the receiver performs the predetermined signal processing in accordance with the NTSC broadcast system. When the APC circuit 4 has not been locked, the processing routine returns to step S8, and the output signal SG3 of the killer circuit 3 is checked again in the PAL broadcast system.

Also, at step S10, if the output signal SG3 of the killer circuit 3 has become a signal indicating the ON state, it is decided that the received signal is not a signal of the NTSC broadcast system. At this time, the crystal oscillator connected to the APC circuit 4 is switched from OSC2 to OSC1 by the control signal SG6 from the automatic discrimination control circuit 6, and the automatic discrimination of the broadcast system is carried out at the crystal oscillator OSC1.

As mentioned above, the automatic discrimination of the broadcast system is carried out by the respective crystal oscillators of the crystal oscillator OSC1 and the crystal oscillator OSC2 by the automatic discrimination control circuit 6. Also, in the above explanation, the automatic discrimination operation was started from the discrimination of the PAL broadcast system, but in an actual case, it is possible to start the discrimination operation from any position of the flow chart shown in FIG. 2.

In the conventional broadcast system automatic-discriminating apparatus mentioned above, as shown in the flow chart of FIG. 2, the automatic discrimination of all broadcast systems is carried out in a state where the respective crystal oscillators of the crystal oscillators OSC1 and OSC2 are selected, therefore a long time is taken for the discrimination from the start to finish and there is a problem in that nothing occurs on the display screen of the TV receiver.

SUMMARY OF THE INVENTION

An object of the present invention is to provide a broadcast system automatic-discriminating apparatus (an automatic mode detector for TV broadcasting system) which can shorten the discrimination time and can prevent various malfunctions and can stably and automatically discriminate the broadcast system.

The broadcast system automatic-discriminating apparatus of the present invention has at least two oscillators having different oscillation frequencies; a switch circuit selecting one oscillator in accordance with a control signal; a phase control circuit which compares phases of a color restoration signal and the oscillated signal of the oscillator selected by the switch, enters into either of a locking state or an unlocking state in accordance with the result of comparison, and outputs a status signal indicating that state; and an automatic discrimination control circuit which outputs a control signal for holding the switch circuit in its connection state to the switch circuit when receiving the status signal indicating the locking state in a scanning period, and outputs a control signal for connecting the other oscillator to the switch circuit when not receiving the status signal indicating the locking state in each section.

Also, in the present invention, the automatic discrimination control circuit outputs the control signal for connecting the other oscillator to the switch circuit when the number of times of receiving the status signal indicating the unlocking state reaches or exceeds a predetermined set number, even if it receives the locking signal during one scanning period.

Also, in the present invention, the automatic discrimination control circuit stops the selection of the oscillator having the predetermined oscillation frequency in the predetermined automatic discrimination operation.

Also, in the present invention, the automatic discrimination control circuit performs the automatic discrimination in accordance with three signals of the killer signal, a discrimination signal from the predetermined discriminating block, and a signal indicating a decision result of the predetermined scanning signal frequency in the predetermined broadcast system.

Further, in the present invention, it is provided with at least two oscillators having different oscillation frequencies; a switch circuit selecting one oscillator in accordance with a control signal; a status signal outputting circuit which detects synchronization of the color restoration signal and the output signal of the selected oscillator, receives this synchronization detection signal and charges or discharges a charging and discharging means with a predetermined time constant ratio, compares the output signal of the charging and discharging means with a preliminarily set threshold value, and outputs a status signal indicating the locking state or the unlocking state in accordance with the result of comparison; and an automatic discrimination control circuit which outputs a control signal for holding the switch circuit in its connection state to the switch circuit when receiving the status signal indicating the locking state and outputs a control signal for connecting the other oscillator to the switch circuit when receiving the status signal indicating the unlocking state.

According to the present invention, the automatic discrimination control circuit sequentially connects the respective oscillators to the phase control circuit and performs the automatic discrimination of the broadcast system in the respective oscillators.

By the automatic discrimination control circuit, a predetermined scanning period, for example, a vertical scanning period, is divided into predetermined intervals, for example, time intervals of an amount of 64 number of times worth of the horizontal scanning period. For example, five sections are obtained. In the five sections, when the output signal of the phase control circuit becomes a signal indicating the locking state even for example for one time, it is decided that the phase control circuit is locked. At this time, the automatic discrimination control circuit outputs the control signal holding the connection state to the switch circuit. By this, the phase control circuit is held in the locked state, and the predetermined signal processing is carried out with respect to the received signal.

When there is no signal indicating the locking state as the output signal of the phase control circuit in the divided five sections, the automatic control circuit decides that the phase control circuit is not locked, outputs the control signal for connecting this to the other oscillator to the switch circuit, and performs the automatic discrimination of the broadcast system by using the other oscillator.

On the other hand, where the phase control circuit has become a locked state and when receiving a status signal indicating the unlocking state by a predetermined number of times, for example, three or more times, in the divided five sections, the automatic discrimination control circuit decides that the locking state of the phase control circuit has been released, outputs the control signal for connecting the other oscillator to the switch circuit, and performs the automatic discrimination operation again.

Also, in the predetermined automatic discrimination operation, the predetermined oscillator, for example, the oscillator of 4.43 MHz, is stopped, whereby the automatic discrimination time is further shortened.

Also, at the time of discrimination of the predetermined broadcast system, for example the SECAM broadcast system, the logical AND of the output signal of the killer circuit, the output signal of the SECAM broadcast system, and the signal indicating the result of discrimination of the frequency of the vertical synchronization signal is taken, and the automatic discrimination of the SECAM broadcast system is carried out based on this result. By this, a malfunction of the automatic discriminating apparatus is avoided.

Further, according to the present invention, the color restoration signal and the output signal of the oscillator selected by the switch circuit are detected for synchronization, and the charging and discharging is carried out with respect to the charging and discharging means such as for example a capacitor by the output signal of detection with a predetermined time constant ratio. Then, the output signal level of the charging and discharging means and the preliminarily set threshold value are compared. When the output signal level reaches the threshold value, the status signal indicating the locking state is output, and conversely, when it does not reach the threshold value, the status signal indicating the unlocking state is output to the automatic discrimination control circuit.

Further, as the time constant ratio when performing the charging and discharging with respect to the charging and discharging means, by setting the time constant for charging slightly longer than that of the discharging, for example by setting the time constant ratio of the charging and discharging to 4:3, a stable status signal is obtained.

In the automatic discrimination control circuit, the connection state of the switch circuit is controlled in accordance with the status signal. For example, when receiving a status signal indicating the locking state, a control signal for holding the current connection state is output to the switch circuit, and when receiving a status signal indicating the unlocking state, a control signal for switching to the other oscillator is output to the switch circuit.

By this, a malfunction in the automatic discrimination is suppressed, and stable automatic discrimination can be carried out.

BRIEF DESCRIPTION OF THE DRAWINGS

The above and other objects and features of the present invention will be apparent the following description with reference to the accompanying drawings, in which.

DESCRIPTION OF THE PREFERRED EMBODIMENT

Figure 3:
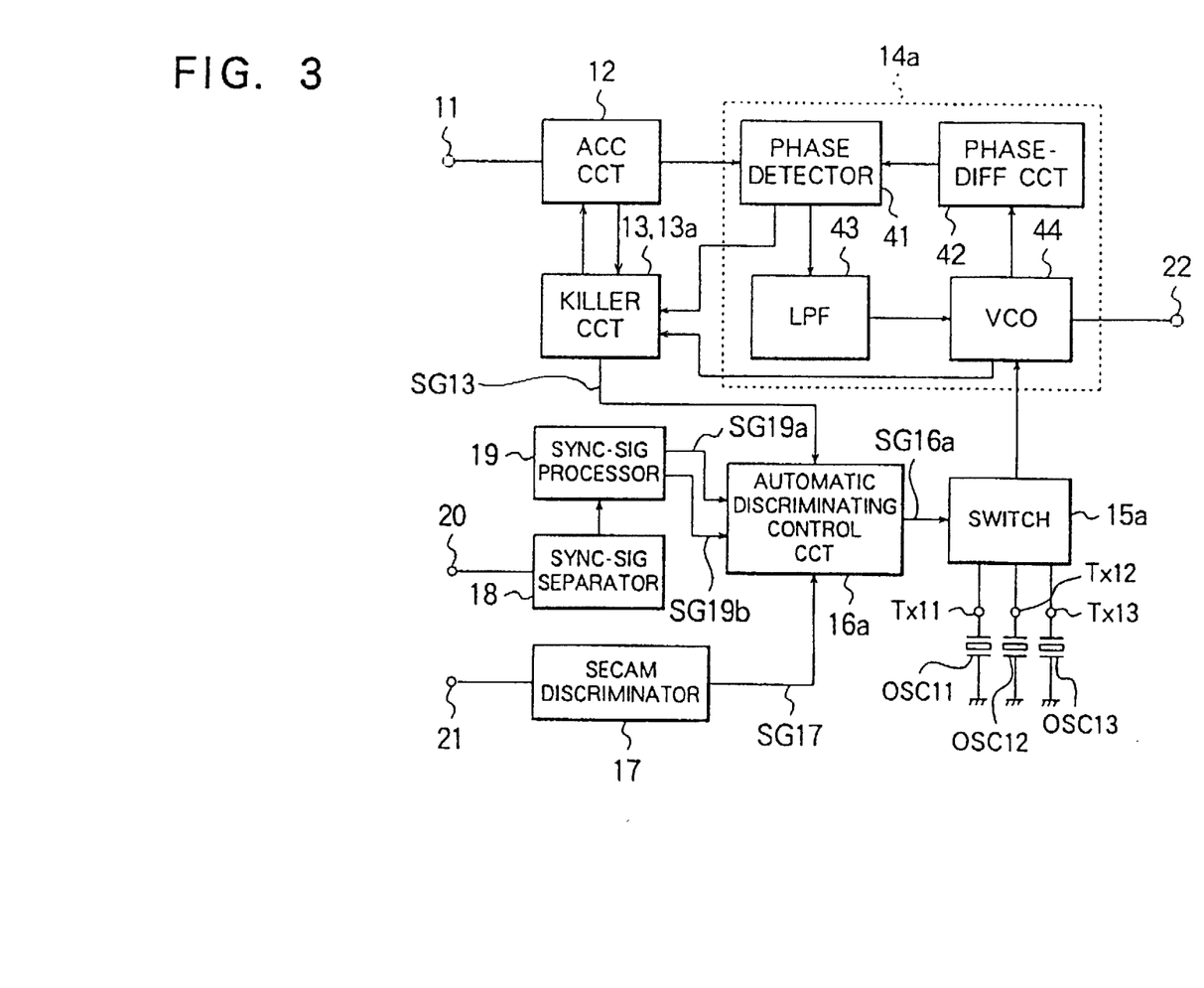
FIG. 3 is a block diagram of one embodiment of a broadcast system automatic-discriminating apparatus according to the present invention.

FIG. 3 is a block diagram showing a first embodiment of a broadcast system automatic-discriminating apparatus according to the present invention.

As shown in FIG. 3, similar to the related art broadcast system automatic-discriminating apparatus shown in the block diagram of FIG. 1, this broadcast system automatic-discriminating apparatus of the present invention is constituted by an automatic color control (ACC) circuit 12, a killer circuit 13, an automatic phase control (APC) circuit 14a, a switch 15a, and an automatic discrimination control circuit 16a, connected to the input terminal 11. Further, in the block diagram of FIG. 3, a SECAM identifying circuit 17, a synchronization signal demultiplexing circuit 18, and a synchronization signal processing circuit 19 are provided. Also, the APC circuit 14a is constituted by a phase detecting circuit 41, a phase difference circuit 42, a low pass filter (LPF) 43, and a voltage control oscillator (VCO) 44 as illustrated. The switch 15a has three input terminals Tx11, Tx12, and Tx13, which are connected to the crystal oscillators OSC11, OSC12, and OSC13, respectively.

To the input terminal 11 is input the color burst signal obtained by the frequency-band amplifier and the color burst signal amplifier.

The ACC circuit 12 detects the amplitude of the input color burst signal, generates a DC voltage based on this, and adjusts the gain of the amplifying circuit. By this, it controls the system so as to hold the density of color of the color video signal constant.

The killer circuit 13 is constituted by for example a synchronization detecting circuit, receives the signals from the ACC circuit 12 and the APC circuit 14a, and detects the presence/absence of the color burst signal. When the color burst signal is detected, it outputs the killer signal SG13 indicating the OFF state, and when the color burst signal is not detected, it outputs the killer signal SG13 indicating the ON state.

In the present embodiment, the automatic discrimination control circuit 16a performs the automatic discrimination of the broadcast system by using the output signal SG13 of this killer circuit 13.

As mentioned before, the APC circuit 14a is constituted by a phase detecting circuit 41, a phase difference circuit 42, a low pass filter (LPF) 43, and a voltage control oscillator (VCO) 44. Here, the internal structure of the APC circuit 14a is irrelevant to the present invention, and therefore this will be simply mentioned.

The phase detecting circuit 41 multiplies the color burst signal received from the ACC circuit 12 provided at a preceding position and the signal received from the phase difference circuit 42 and performs the phase detection. The phase difference circuit 42 adds the predetermined phase difference to the oscillation signal received from the VCO 44 and supplies the same to the phase detecting circuit 41. The high frequency component of the signal generated by the multiplication at the phase detection circuit 41 is removed through the low pass filter 43 to give the low frequency signal which is then input to the VCO 44. The VCO 44 is controlled in its oscillation frequency in accordance with the low frequency signal received from the low pass filter. By this, a signal oscillated with a stable frequency is output to the output terminal 22 of the VCO 44 with a predetermined phase difference from the signal input to the ACC circuit 12.

The signal output to the output terminal 22 is input to the color demodulation circuit as the reference sub-carrier wave for the color demodulation.

The switch 15a has a function of selectively connecting the crystal oscillators OSC11, OSC12, and OSC13 connected to the three terminals Tx11, Tx12, and Tx13 to the VCO 44 in accordance with the control signal SG16a from the automatic discrimination control circuit 16a.

The automatic discrimination control circuit 16a performs the operation of the automatic discrimination while further detecting the output signal SG13 of the killer circuit 13 based on the signals SG17, SG19a, and SG19b from the SECAM identifying circuit 17 and the synchronization signal processing circuit 9 and outputs a control signal SG16a for connecting one of the crystal oscillators OSC11, OSC12, and OSC13 to the VCO 44 with respect to the switch 15a.

The SECAM identifying circuit 17 outputs the SECAM discrimination ON-OFF signal SG17 for controlling the discrimination of the SECAM broadcast system to the automatic discrimination control circuit 16a based on the signal input from the other circuit.

To the input terminal 20 is input a composite signal including a luminance signal, a carrier wave color signal, a color burst signal, a synchronization signal, etc. Based on this signal, the synchronization signal demultiplexing circuit 18 demultiplexes a vertical synchronization signal and a horizontal synchronization signal among the composite signals and supplies these to the synchronization signal processing circuit 19.

The synchronization signal processing circuit 19 generates a pulse signal S19a (VPULSE) in synchronization with the vertical synchronization signal based on the vertical synchronization signal and the horizontal synchronization signal input from the synchronization signal demultiplexing circuit 18 and supplies the same to the automatic discrimination control circuit 16a. Further, it decides the frequency of the vertical synchronization signal and supplies a discrimination signal S19b for identifying the 50/60 Hz to the automatic discrimination control circuit 16a.

Above, an explanation was made of the configuration and function of the different portions of the broadcast system automatic-discriminating apparatus of the present embodiment shown in FIG. 3. Below, an explanation will be made of the automatic discriminating apparatus of the present embodiment referring to a flow chart showing the automatic discrimination operation of FIG. 4 based on this configuration.

Figure 4:
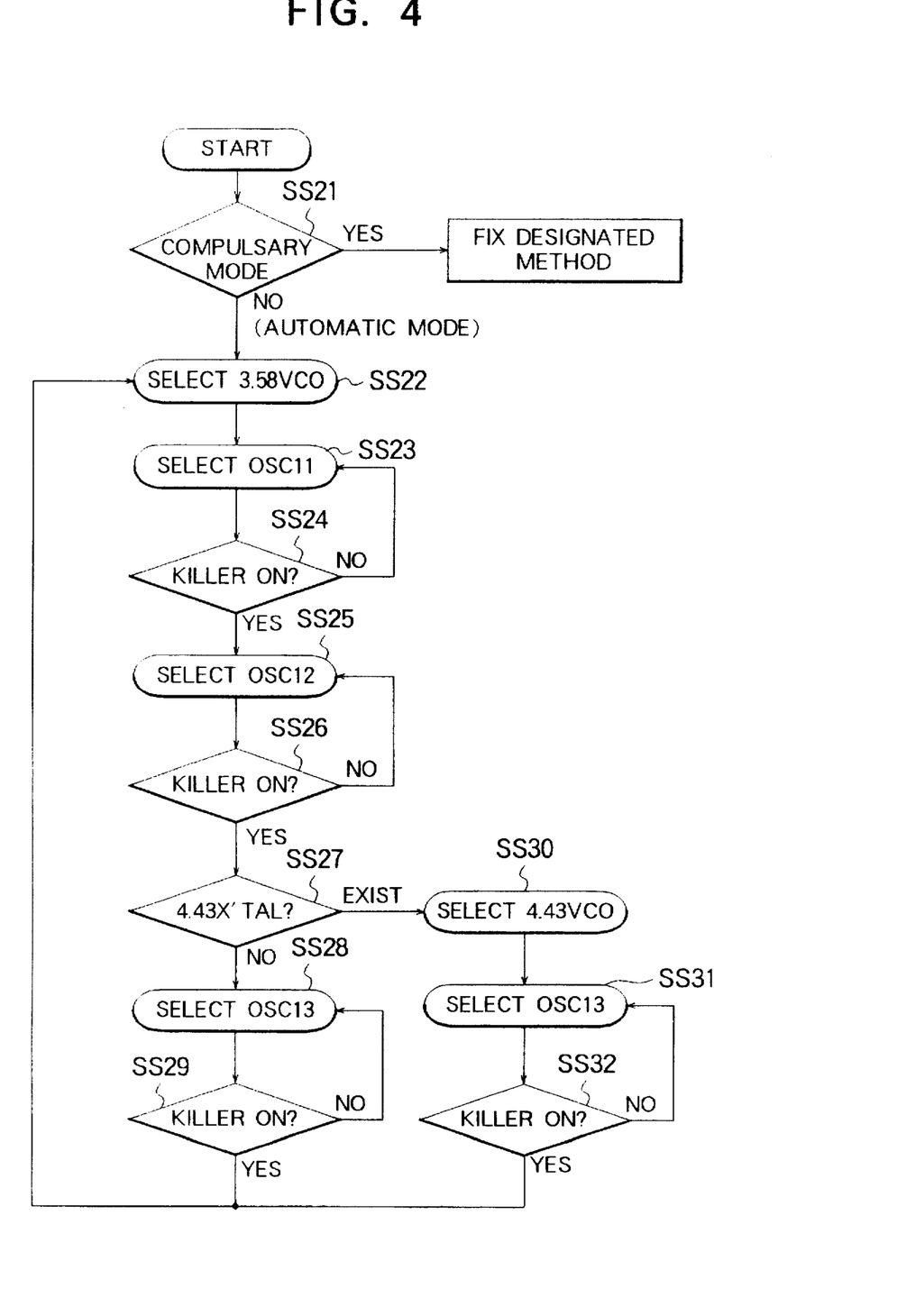
FIG. 4 is a flow chart of the operation of the broadcast system automatic-discriminating apparatus according to the present invention.

As shown in FIG. 4, the discriminating apparatus of the present embodiment is designed to enable selection of the automatic discrimination mode and the compulsory discrimination mode by a microcomputer provided in the TV receiver. The compulsory mode is the mode for fixing the system to a designated broadcast system. In this mode, the frequency of the vertical synchronization signal, the setting of the demodulation axis, the VCO to be used, and the crystal oscillator to be connected to the VCO are compulsorily set up by the microcomputer. Note that, the present mode is irrelevant to the present invention, and therefore a detailed explanation of the method of setting it will be omitted.

Below, the operation of the flow chart of FIG. 4 will be sequentially explained. First, at step SS21, the selected mode is discriminated. Where the compulsory mode is selected, the system is fixed to the designated broadcast system and the predetermined signal processing is carried out by the receiver.

Where the selected mode is the automatic discrimination mode at step SS21, the automatic discrimination of the broadcast system is carried out as follows. As in steps SS22 to SS26 of FIG. 4, first, the VCO for oscillating near 3.58 MHz is selected, then the switch 15a connects the crystal oscillator OSC11 to the VCO 44 by the control signal SG16a from the automatic discrimination control circuit 16a. At the oscillation frequency of the crystal oscillator OSC11, the output signal SG13 of the killer circuit 3 is checked. When the APC circuit 14a is locked to the signal received from the ACC circuit 12, the output signal SG13 of the killer circuit 13 becomes a signal indicating the OFF state. In this case, the connection state of the switch 15a is held by the control signal SG16a from the automatic discrimination control circuit 16a, and the predetermined signal processing is carried out by the receiver.

Here, as shown at step SS24, when the output signal SG13 of the killer circuit 13 has become a signal indicating the ON state, the processing routine goes to step SS25, at which the switch 15a connects the crystal oscillator OSC12 to the VCO 44 by the control signal SG16a from the automatic discrimination control circuit 16a. At the oscillation frequency of the crystal oscillator OSC12, the output signal SG13 of the killer circuit 13 is checked. When the output signal SG13 of the killer circuit 13 has become a signal indicating the OFF state, the APC circuit 14a is held in the locked state, and the predetermined signal processing is carried out by the TV receiver.

Also, when the output signal SG13 of the killer circuit 13 has become a signal indicating the ON state, the processing routine goes to step SS27, at which the presence/absence of a VCO for oscillating near 4.43 MHz is decided. When such a VCO is provided in the circuit, the processing routine goes to step SS30. On the other hand, when such a VCO is not provided in the circuit, the processing routine goes to step SS28.

At step SS28, the switch 15a connects the crystal oscillator OSC13 to the VCO 44 by the control signal SG16a from the automatic discrimination control circuit 16a. At the oscillation frequency of the crystal oscillator OSC13, the output signal SG13 of the killer circuit 13 is checked. When the output signal SG13 of the killer circuit 13 has become a signal indicating the OFF state, the APC circuit 14a is held in the locked state, and the predetermined signal processing is carried out by the TV receiver.

When the output signal SG13 of the killer circuit 13 has become a signal indicating the ON state, as shown in FIG. 4, the processing routine returns to step SS22 again, that is, the VCO for oscillating near 3.58 Mz is selected, and at the frequencies oscillated by the respective crystal oscillators, the automatic discrimination of the broadcast system is carried out.

On the other hand, at step SS27, when it is decided that there is a VCO for oscillating near 4.43 MHz, the processing routine goes to step SS30, at which this VCO is selected, the switch 15a connects the crystal oscillator OSC13 to this VCO by the control signal SG16a from the automatic discrimination control circuit 16a, and at the oscillation frequency of the crystal oscillator OSC13, the output signal SG13 of the killer circuit 13 is checked. When the output signal SG13 of the killer circuit 3 has become a signal indicating the OFF state, the APC circuit 14a is held in the locked state, and the predetermined signal processing is carried out by the receiver. When the output signal SG13 of the killer circuit 13 has becomes a signal indicating the ON state, the processing routine returns to step SS22 again, that is, the VCO for oscillating near 3.58 MHz is selected, and at the frequencies oscillated by the respective crystal oscillators, the automatic discrimination of the broadcast system is carried out.

Here, an explanation will be made of the method of discrimination of the locking state of the APC circuit 14a by the output signal SG13 of the killer circuit 13 referring to the waveform diagram of FIG. 5.

Figure 5A:
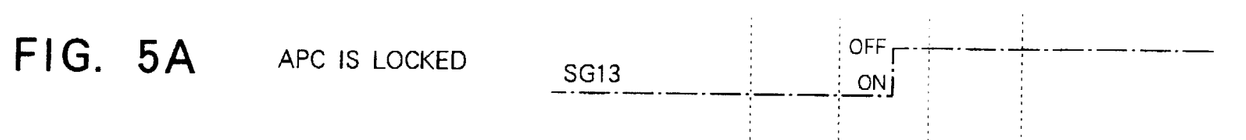
FIG. 5A to 5D are waveform diagrams showing signals in a locking state discrimination of an APC circuit.
Figure 5B:
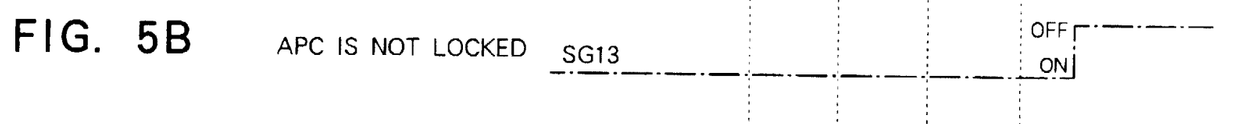
Figure 5C:
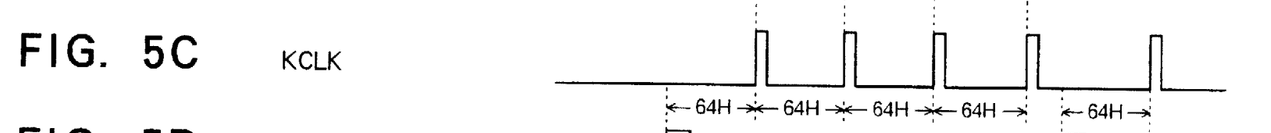
Figure 5D:
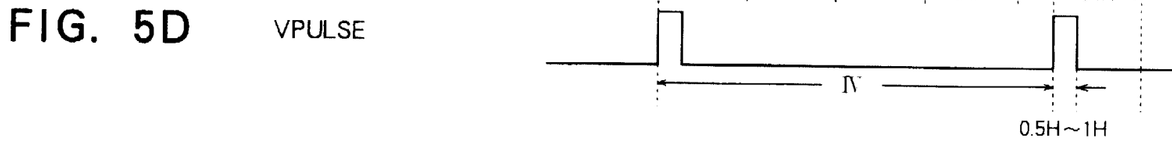

FIGS. 5A to 5D are waveform diagrams for discriminating the locking state of the APC circuit 14a by the output signal SG13 of the killer circuit 13. FIG. 5A is a waveform diagram of the output signal SG13 of the killer circuit 13 where it is decided that the APC circuit 14a is locked; FIG. 5B is a waveform diagram of the output signal SG13 of the killer circuit 13 where it is decided that the APC circuit 14a is not locked; FIG. 5C is a waveform diagram of a killer detection clock KCLK; and FIG. 5D is a waveform diagram of the VPULSE; respectively.

The VPULSE shown in FIG. 5D is a pulse generated in synchronization with the vertical synchronization signal by the synchronization signal processing circuit 19. The killer detection clock KCLK shown in FIG. 5C is a clock signal generated at every 64 H from the rising of the VPULSE. Note that, here, H designates the cycle of the horizontal synchronization signal.

By the killer detection clock KCLK, the amount of one cycle (1 V) of the vertical synchronization signal is divided into five sections. In these five sections, the state indicated by the output signal SG13 of the killer circuit 13 is continuously checked. For example, as shown in FIG. 5A, when the output signal SG13 of the killer circuit 13 indicates an OFF state even one time in the five sections, it is decided that the APC circuit 14a is locked, the APC circuit 14a is held in this state, and the predetermined signal processing is carried out by the receiver. Then, even if the APC circuit 14a is locked, while detecting the output signal of the killer circuit 13 by the killer detection clock KCLK, when for example the number of sections in which the output signal of the killer circuit 13 has become a signal indicating the ON state is three or more among the five sections sectioned by the killer detection clock KCLK, it is decided that the APC circuit 14a is not locked, the switch 15a connects the other crystal oscillator to the VCO 44 by the control signal SG16a from the automatic discrimination control circuit 16a, and the automatic discrimination of the broadcast system is carried out again. By this, a malfunction of the killer circuit 13 due to noise of the received signal etc. and locking to the erroneous state are avoided Also, in the present embodiment, with a view toward use of the system for the South American region, provision is made of a function for passing through a discrimination loop using the VCO for 4.43 MHz (the frequencies of SC of PALM/N of the South America area are 3.575611 MHz and 3.582056 MHz, respectively). By using this function, where a multiple-system receiver in which 4.43 MHz is not included is constituted, the discrimination time can be further shortened.

Further, when performing automatic discrimination where a VCO for 4.43 MHz exists, only the automatic discrimination in the crystal oscillator for 4.43 MHz is carried out. The automatic discrimination in the other crystal oscillator is not carried out. This is for preventing a long discrimination time due to the discrimination of both of 4.43 MHz and 3.58 MHz by all crystal oscillators.

Furthermore, in the automatic discrimination of the SECAM broadcast system, when the conditions are met that discrimination of 4.43 MHz is carried out for a period of 5 V, the output signal SG13 of the killer circuit indicates the ON state during that time, the result of discrimination of the frequency of the vertical synchronization signal is 50 Hz, and the identification signal from the SECAM decoder is in the ON state, it is decided that the received signal is by the SECAM system, the APC circuit 14a is held in the locked state, and the receiver performs the predetermined signal processing in accordance with the SECAM broadcast system. If even one of these three conditions is not met, the automatic discrimination is commenced again.

By this, in the automatic discrimination of the SECAM broadcast system, a stable result of discrimination is obtained.

As explained above, according to the first embodiment, when a vertical synchronization signal section (1 v) is divided into five sections by the killer detection clock KCLK, and the output signal SG13 of the killer circuit 13 becomes a signal indicating the OFF state by even one time in each section, the automatic discrimination control circuit 16a decides that the APC circuit 14a is locked and outputs the control signal SG16a for holding the connection state with respect to the switch 15a. By this, the locking state of the APC circuit 14a is held.

Also, when the number of times that the output signal of the killer circuit 13 indicates the ON state becomes three or more in the five sections divided by the killer detection clock KCLK, the automatic discrimination control circuit 16a decides that the lock of the APC circuit 14a is released, outputs the control signal for connecting the other crystal oscillator to the VCO 44 to the switch 15a, and performs the automatic discrimination of the broadcast system again. By this, a malfunction of the APC circuit 14a and the killer circuit 13a due to the noise of the received signal etc. and locking in an erroneous state can be avoided.

Further, according to the present embodiment, the system is set so that a loop not performing discrimination at 4.43 MHz can be selected for the usual automatic discrimination operation, whereby a further shorter time of automatic discrimination than the usual automatic discrimination can be realized.

In the first embodiment, one vertical synchronization signal section (1 V) was divided into five sections by the killer detection clock KCLK, and the automatic discrimination operation was carried out by the state of the killer signal SG13 indicating the ON-OFF state of the killer circuit 13. By performing this, erroneous operation of the killer circuit 13 can be prevented.

Figure 6:
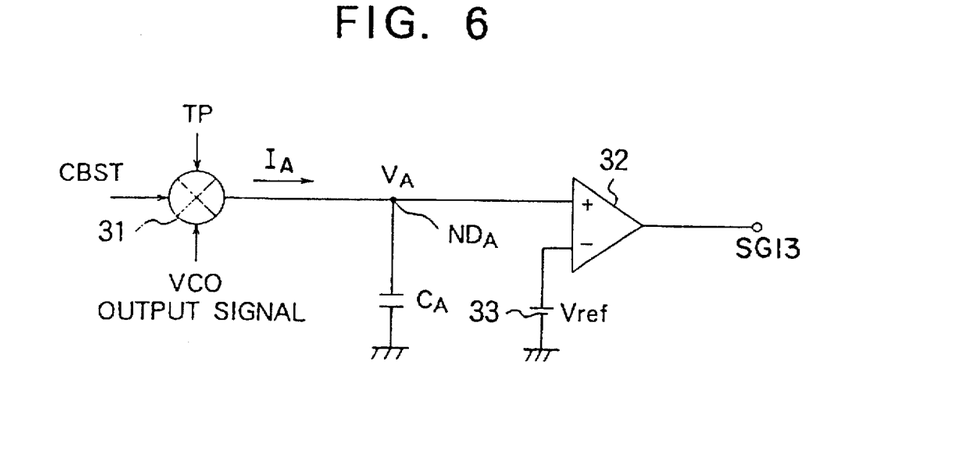
FIG. 6 is a simple circuit diagram of a killer circuit.

FIG. 6 is a view for explaining the second embodiment of the broadcast system automatic-discriminating apparatus according to the present invention and shows a circuit diagram of the killer circuit 13a—which is the principal part thereof. The second embodiment realizes a more stabler, higher precise automatic discrimination. An explanation will be made of specific details thereof in order referring to the drawings.

As shown in FIG. 6, the killer circuit 13a is constituted by a multiplier 31, a capacitance element $C_A$, a comparator 32 and a constant voltage source 33.

The output line of the multiplier 31 is connected to one electrode of the capacitor $C_A$. The point of connection of them constitutes a node $ND_A$. Further, the node $ND_A$ is connected to the noninverted input terminal (+) of the comparator 32, and a constant voltage source 33 is connected to the inverted input terminal (−) of the comparator 32.

The color burst signal CBST and the output signal of the VCO 44 shown in FIG. 3 are input to the multiplier 31. Further, the operation of the multiplier 31 is controlled by the timing pulse TP in synchronization with the color burst signal CBST, so the multiplier 31 operates only in the section of the color burst signal CBST.

The sine wave vibrating by a difference of the frequencies of the output signal of VCO 44 and the color burst signal CBST input to the multiplier 31 is output. Further, a current $I_A$ proportional to the amplitude of the sine wave is output to the node $ND_A$ by the timing pulse TP in synchronization with the color burst signal CBST, and the capacitor $C_A$ is charged or discharged.

The output line of the multiplier 31 is connected to the node $ND_A$, and the capacitor $C_A$ and the noninverted input terminal (+) of the comparator 32 are connected to the node $ND_A$. The constant voltage source 33 is connected to the inverted input terminal (−) of the comparator 32, a reference voltage $V_{ref}$ is applied, and the output of the comparator 32 becomes the killer signal SG13.

When the color burst signal CBST and the output signal of the VCO44 are synchronous, the output current $I_A$ of the multiplier 31 flows in a direction indicated by an arrow in FIG. 6, the capacitor $C_A$ is charged by this current $I_A$, and the voltage $V_A$ of the node $ND_A$ rises. Then, when the voltage $V_A$ of the node $ND_A$ becomes higher than the reference voltage $V_{ref}$, the output signal of the comparator 32 becomes a high level. This output killer signal SG13a of a high level indicates that the color burst signal CBST and the output signal of the VCO 44 are synchronous.

On the other hand, when the color burst signal CBST and the output signal of the VCO 44 are not synchronous, the output current $I^1A$ of the multiplier 31 flows in an inverse direction to that indicated by the arrow, the capacitor $C_A$ is discharged, and the voltage $V_A$ of the node $ND_A$ falls. When the voltage $V_A$ of the node $ND_A$ becomes lower than the reference voltage $V_{ref}$, the output signal of the comparator 32 becomes the low level. This killer signal SG13 of the low level indicates that the color burst signal CBST and the output signal of the VCO 44 are not synchronous.

Figure 7A:
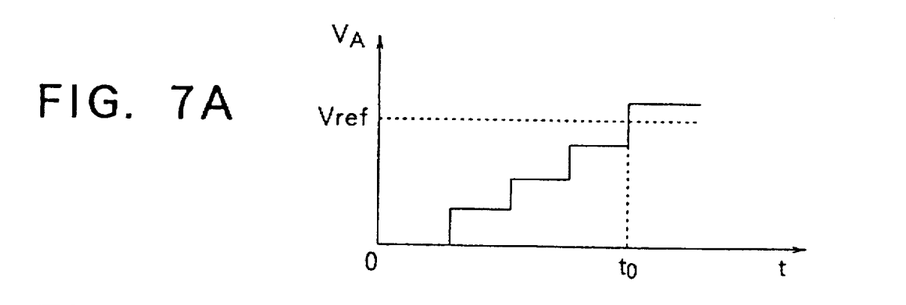
FIG. 7A to 7C are timing charts showing an off/on time constant.
Figure 7B:
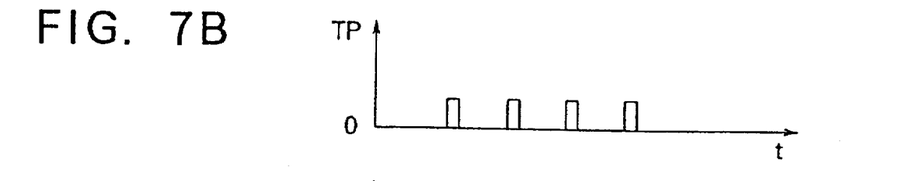
Figure 7C:
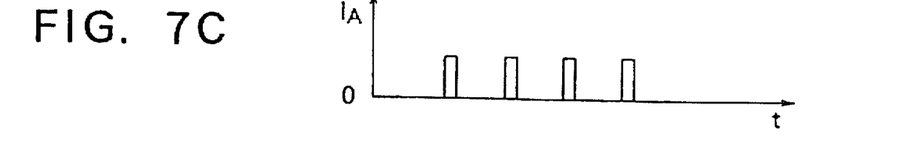

FIGS. 7A to 7C are are timing charts indicating that the capacitor $C_A$ is charged by the current $I_A$ in synchronization with the timing pulse TP, and the voltage $V_A$ of the node $ND_A$ rises.

As illustrated, the capacitor $C_A$ is charged by the current $I_A$, the voltage $V_A$ of the node NDA gradually rises, and when a certain time to is reached, the voltage $V_A$ of the node $ND_A$ becomes higher than the reference voltage $V_{ref}$ of the comparator 32 shown in FIG. 3, and the output signal of the killer circuit 13a becomes the high level. This reference voltage $V_{ref}$ is the threshold value level of the killer circuit 13a.

Also, the amount of time $t_0$ from when the voltage $V_A$ of the node $ND_A$ is 0V to when the reference voltage $V_{ref}$ is reached by the cycle of the timing pulse TP is the off/on time constant of the killer circuit 13a. In the illustrated case, the off/on time constant of the killer circuit 13a is 14.

Further, where the capacitor $C_A$ is discharged and the voltage $V_A$ of the node $ND_A$ falls, the time required until the voltage $V_A$ of the node $ND_A$ falls from the reference voltage $V_{ref}$ to 0V is the on/off time constant of the killer circuit 13a. Although not illustrated for the on/off time constant of the killer circuit 13a, usually, by adjusting the structure of the circuit, the off/on time constant and the on/off time constant of the killer circuit 13a are separately set.

Here, when for example the automatic discriminating apparatus is locked by the NTSC signal and the input signal is changed to the PAL/M signal, the output of the synchronization detecting circuit of the killer circuit 13a, that is, the multiplier 31, becomes the sine wave using a difference between the frequency of the color burst signal CBST of the NTSC signal and the frequency of the color burst signal CBST of the PAL/M signal as the frequency. Hereinafter, this output signal will be referred to as a difference signal.

The frequency $f_{SCN}$ of the color burst signal CBST of the NTSC signal is 3.579545 MHz, and the frequency $f_{SCP}$ of the color burst signal CBST of the PAL/M signal is 3.57561149 MHz, therefore the difference $f_D$ thereof becomes as follows.

$$f_D = f_{SCN} - f_{SCP} = 3.93351 \text{ kHz} = f_H/4$$

Note that, $f_H$ (=15.734264 kHz) is the frequency of the horizontal synchronization signal of the NTSC signal. Namely, the frequency of the difference signal is ¼ of the horizontal synchronization signal frequency $f_H$.

Figure 8A:
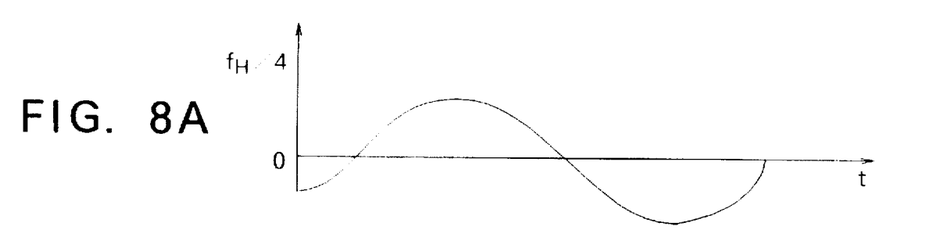
FIG. 8A to 8C are timing charts of an output current of a detector.
Figure 8B:
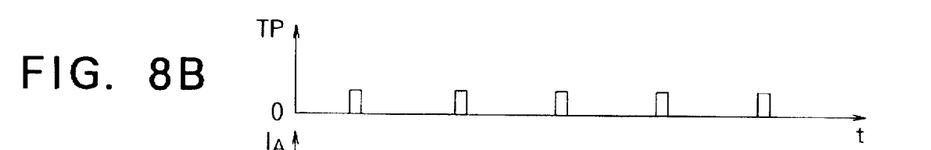
Figure 8C:
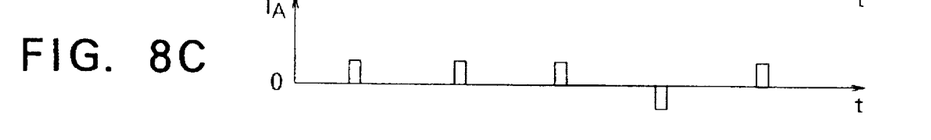

FIGS. 8A to 8C are timing charts showing the phase relationship between the difference signal and the timing pulse TP.

When the difference signal and the timing pulse TP have the illustrated phase relationship, the output current $I_A$ of the multiplier 31 is repeatedly generated with a proportion of three times in a positive direction and one time in a negative direction as shown in FIG. 8C. As a result of the capacitor $C_A$ being charged by this current $I_A$, there is a repetition of the voltage $V_A$ of the node $ND_A$ rising three times and falling one time.

At this time, if the ratio of the off/on time constant of the killer circuit 13a to the on/off time constant were 3:1, chattering would be generated in the output signal of the killer circuit 13a and the output would become unstable.

Figures 9A, 9B:
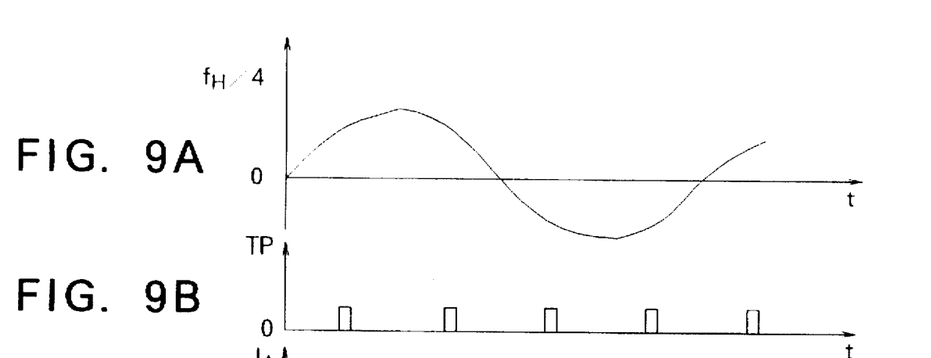
FIG. 9A to 9C are timing charts of the output current of a detector.
Figure 9C:
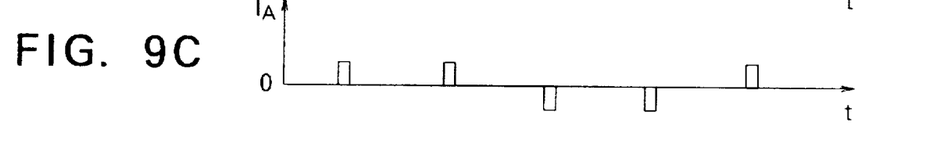

Also, where the phase relationship between the difference signal and the timing pulse TP is as shown in FIG. 9B, the output current $I_A$ of the multiplier 31 is repeatedly generated two times in the positive direction and two times in the negative direction, whereby the capacitor $C_A$ is charged, and the voltage $V_A$ of the node $ND_A$ repeatedly rises two times and falls two times.

At this time, if the ratio of the off/on time constant of the killer circuit 13a to the on/off time constant were 1:1, chattering would be generated in the output signal of the killer circuit 13a, and the output would become unstable.

Therefore, by setting the ratio of the off/on time constant of the killer circuit 13a to the on/off time constant to 4:3, generation of the chattering is suppressed and a stable killer signal SG13a is output from the killer circuit 13a.

The automatic discrimination control circuit 16a controls the connection state of the switch 15a in accordance with the killer signal SG13. For example, when the killer signal SG13 is at a high level, the color burst signal and the output signal of VCO 44 are synchronous. Namely, it is decided that the APC circuit 14a is in the locking state, and the control signal for holding the connection state of the switch 15a is output to the switch 15a.

On the other hand, when the killer signal SG13 is at a low level, it is decided that the color burst signal and the output signal of VCO44 are not synchronous, that is, the APC circuit 14a is not locked, and a control signal for switching the switch 15a to the other crystal oscillator is output to the switch 15a.

As explained above, according to the present second embodiment, in the killer circuit 13a, the output signal of the VCO 44 and the color burst signal CBST are input to the synchronization detecting circuit constituted by the multiplier 31, and further the operation of the multiplier 31 is controlled by the timing pulse TP in synchronization with the color burst signal CBST, the capacitor $C_A$ is charged and discharged by the output current $I_A$ of the multiplier 31, the voltage $V_A$ generated by this is input to the noninverted input terminal of the comparator 32, it is compared with the reference voltage $V_{ref}$ input to the inverted input terminal of the comparator 32, the killer signal SG13a is output in accordance with the result of comparison, and the ratio of the off/on time constant of the killer circuit 13a to the on/off time constant is set to 4:3, therefore there is an advantage that a stable killer signal SG13a is obtained and the automatic discrimination of the broadcast system based on this can be carried out without malfunction.

Note that, in the second embodiment, the ratio of time constants was set to 4:3, but it is not limited to this. It is also possible to set another ratio of the time constants with which a stable output is obtained.

As explained above, according to the broadcast system automatic-discriminating apparatus of the present invention, a broadcast system automatic-discriminating apparatus with which the discrimination time can be shortened can be realized.

Also, there is an advantage that a malfunction can be prevented and a stable discrimination result is obtained.

What is claimed is:

1. An automatic mode detector for a TV broadcasting system, comprising:

at least two oscillators having different oscillation frequencies;

a switch circuit which selectively connects one of said oscillators to a phase control circuit in accordance with a control signal;

wherein said phase control circuit compares a phase of a color restoration signal and a phase of an oscillated signal of the selected oscillator, enters into either of a locking state or an unlocking state in response to the comparison, and outputs a status signal indicating whether said locking or said unlocking state has been entered; and     an automatic discrimination control circuit which receives said status signal a predetermined number of times during a scanning period and which outputs said control signal to said switch circuit in response to said status signal,     wherein said automatic discrimination control circuit maintains the switch circuit in its connection state if each time the status signal is received during a scanning period the status signal indicates the locking state and     wherein said automatic discrimination control circuit outputs a control signal causing said switch circuit to connect to a different oscillator if a number of times said status signal indicates the unlocking state during a scanning period equals or exceeds a predetermined value.

2. An automatic mode detector as set forth in claim 1, wherein the automatic discrimination control circuit prevents selection of one of said oscillators having a predetermined oscillation frequency in a predetermined automatic discrimination operation.

3. An automatic mode detector as set forth in claim 1, wherein the automatic discrimination control circuit performs the automatic discrimination in accordance with three signals, said three signals being the status signal, and a pulse signal and a discrimination signal from a synchronization signal processing circuit.

4. An automatic mode detector for a TV broadcasting system comprising:

at least two oscillators having different oscillation frequencies;

a switch circuit selecting one of said oscillators in accordance with a control signal;

a status signal outputting circuit which detects synchronization of a color restoration signal and an output signal of the selected oscillator, charges or discharges a capacitance element having a predetermined time constant ratio in response to said synchronization, compares an output signal of the capacitance element with a predetermined threshold value, and outputs a status signal indicating a locking state or an unlocking state in accordance with a result of the comparison of the output signal of the capacitance element and the predetermined threshold value; and an automatic discrimination control circuit which outputs said control signal for causing the switch circuit to connect to another of said oscillators when said automatic discrimination control circuit receives a status signal indicating the unlocking state.

5. An automatic mode detector as set forth in claim 4, wherein the time constant ratio of the capacitance element is set to 4:3.

6. An automatic mode detector as set forth in claim 1, wherein said automatic discrimination control circuit outputs a control signal causing said switch circuit to connect to a different oscillator after said scanning period unless each time said status signal is received by said automatic discrimination control circuit during the scanning period the status signal indicates the locking state.

7. An automatic mode detector as set forth in claim 1, wherein the automatic discrimination control circuit prevents selection of one of said oscillators having a predetermined oscillation frequency in a predetermined automatic discrimination operation.

8. An automatic mode detector as set forth in claim 6, wherein the automatic discrimination control circuit performs the automatic discrimination in accordance with three signals, said three signals being the status signal, and a pulse signal and a discrimination signal from a synchronization signal processing circuit.

9. An automatic mode detector for a TV broadcasting system comprising:

three oscillators for subcarriers of NTSC, PAL and SECAM having different oscillation frequencies;

a switch circuit which selects one oscillator of said three oscillators in accordance with a control signal;

a phase control circuit which compares a phase of a color rest oration signal and a phase of an oscillated signal of the selected oscillator, enters into either of a locking state or an unlocking state in response to the comparison, and outputs a status signal indicating whether said locking or said unlocking state has been entered; and an automatic discrimination control circuit which outputs said control signal causing said switch circuit to select a different oscillator unless the status signal received from the phase control circuit indicates the locking state in a predetermined number of sections of a scanning period divided into five sections.

10. An automatic mode detector as set forth in claim 9, wherein, the automatic discrimination control circuit outputs the control signal for causing the switch circuit to select a different oscillator of said oscillators when the number of said sections in which a status signal indicating the unlocking state is received equals three or more.

11. An automatic mode detector as set forth in claim 9, wherein the automatic discrimination control circuit selectively stops the operation of the oscillators having the three oscillation frequencies in a predetermined automatic discrimination operation.

12. An automatic mode detector as set forth in claim 9, wherein the automatic discrimination control circuit performs the automatic discrimination in accordance with three signals, said three signals being the status signal, and a pulse signal and a discrimination signal from a synchronization signal processing circuit.

* * * * *